US007375444B2

(12) United States Patent
Staines et al.

(10) Patent No.: US 7,375,444 B2

(45) Date of Patent: May 20, 2008

(54) MICROWAVE GENERATOR

(75) Inventors: Geoffrey Staines, Röthenbach (DE); Frank Sonnemann, Nürnberg (DE); Jürgen Bohl, Eckenhald (DE); Tilo Ehlen, Nürnberg (DE); Josef Dommer, Nürnberg (DE)

(73) Assignee: Diehl Munitionssysteme GmbH & Co., Rothenbach (DE)

( * ) Notice: Subject to any disclaimer, the term of this patent is extended or adjusted under 35 U.S.C. 154(b) by 598 days.

(21) Appl. No.: 10/821,006

(22) Filed: Apr. 8, 2004

(65) Prior Publication Data

US 2004/0201942 A1 Oct. 14, 2004

(30) Foreign Application Priority Data

Apr. 9, 2003 (DE) ................................ 103 16 120

(51) Int. Cl.
*H02M 3/18* (2006.01)
*H01H 79/00* (2006.01)

(52) U.S. Cl. ....................................... 307/100; 307/110

(58) Field of Classification Search ................ 307/100, 307/110, 109

See application file for complete search history.

(56) References Cited

U.S. PATENT DOCUMENTS 1,380,872 A 6/1921 Thompson
3,748,528 A * 7/1973 Cronson ...................... 315/39
4,760,311 A 7/1988 Wootton (Continued)

FOREIGN PATENT DOCUMENTS

DE 245358 3/1910

(Continued)

OTHER PUBLICATIONS

Rustung, “Den Laptop im Tornister”, Spiegel of Feb. 10, 1997.

(Continued)

*Primary Examiner*—Michael Sherry
*Assistant Examiner*—Michael Rutland-Wallis
(74) *Attorney, Agent, or Firm*—Scully, Scott, Murphy & Presser, P.C.

(57) ABSTRACT

A microwave generator (11) has a parallel connection of series connections of uncontrolled discharge spark gaps (13) and charge storage means (12) which are charged up by way of charging resistors (17) and an inductor (19) common to all parallel connections, from a high voltage generator (26), until the respective spark gaps (13) short-circuit by way of arcs and the storage means (12) are discharged again by way of the inductor (19). The oscillating short-circuit currents which thus occur in stochastic steep-edged manner and which are superimposed on each other in the inductor (19) are emitted by way of an antenna (21) connected in single-pole manner thereto in the form of a high-energy microwave spectrum which is wide-band in accordance with the arc switching speed, with a spectral key point which is determined by the inductor (19). Such an operative system which can be used as a non-lethal interference or jamming device in relation to communication connections and in relation to the function of electronic circuits can be embodied in the size of a manually portable case or also in the form of a payload for a submunition projectile, a rocket or a drone and can thus be used over a wide operative range.

6 Claims, 1 Drawing Sheet

U.S. PATENT DOCUMENTS

| | | | | | |
|---|---|---|---|---|---|
| 4,845,378 | A | | 7/1989 | Garbe et al. | |
| 5,293,527 | A | | 3/1994 | Sutton et al. | |
| 5,412,254 | A | * | 5/1995 | Robinson et al. | 307/106 |
| 5,567,995 | A | * | 10/1996 | O'Loughlin et al. | 307/109 |
| 5,835,545 | A | | 11/1998 | Turchi | |
| 6,066,901 | A | * | 5/2000 | Burkhart et al. | 307/106 |
| 7,110,500 | B2 | * | 9/2006 | Leek | 378/111 |

FOREIGN PATENT DOCUMENTS

| | | | |
|---|---|---|---|
| DE | 2650624 | C2 | 5/1978 |
| DE | 35 28 338 | C1 | 1/1993 |
| DE | 199 59 358 | A1 | 6/2001 |
| FR | 2 823 033 | A | 10/2002 |

OTHER PUBLICATIONS

D. Sridar, "EMP—Nightmare for Industrialized Nations", *Strategic Affairs*, Nr. 22; Jun. 16, 2001.

* cited by examiner

MICROWAVE GENERATOR

BACKGROUND OF THE INVENTION

1. Field of the Invention

The invention concerns a microwave generator 1 which includes a charge storage means and an untriggered discharge spark gap which is connected in series therewith.

The invention concerns a microwave generator as set forth in the classifying portion of claim 1.

The function of such a generator is based on the fact that a high voltage storage means, for example an array of capacitors which is first charged up in parallel in accordance with the principle of the Marx impulse voltage source and then connected in series by way of switching spark gaps, is discharged by way of a short circuit spark gap. The resulting steep edge of strongly oscillating discharge currents contains a mixture of very high frequencies, which is emitted in the form of microwave energy by way of the line guide or by way of a separately connected antenna. That wide-band microwave spectrum involves such a high energy density that, in the area around such a microwave generator, radio communication is at least impaired and input circuits of electronic circuit arrangements can be damaged or even destroyed, by virtue of resonance effects.

2. Discussion of the Prior Art

It is known for example from U.S. Pat. No. 4,845,378 A to switch over arrays of capacitors by way of spark gap switches of the above-mentioned kind, in that case for generating an electromagnetic pulse for the simulation of a really triggered nuclear pulse.

U.S. Pat. No. 4,760,311 A provides that a steep-edge voltage pulse can be influenced by electron beams. DE 35 28 338 C1 describes fast explosive-operated magnetic field compression for current amplification for a magnetic field effective as a non-lethal weapon. A comparable technology is used in U.S. Pat. No. 5,835,545 A for a compact intensive radiation source.

Because of the possibility of affecting radio connections the effect of intensive microwave emission as a non-lethal weapon is propagated against enemy communication systems, see DER SPIEGEL, Issue July 1997, pages 53 if, there the end of paragraph 3 of the left-hand column on page 54.

SUMMARY OF THE INVENTION

The present invention is based on the technical object of emitting high-energy microwave energy in as wide a band as possible; more specifically from a microwave generator (also referred to as an HPMW-generator) which is autonomous in regard to its power supply and which can be moved without problem in terms of its dimensions and can be employed in a particularly universal fashion in regard to its emission spectrum and in regard to energy density and thus its effective range.

In accordance with the invention that object is attained by the combination of the essential features, which is set forth in the main claim, whereby the energy from a high voltage source is firstly transferred into a relatively large number of charge storage means which are connected in parallel with each other and which are then virtually simultaneously short-circuited by way of self-triggering discharge spark gaps. That produces in a discharge circuit which is common to all charge storage means, a respective time-limited current pulse which starts with a steep edge and which oscillates strongly, of respectively short duration and high amplitude, comprising very high frequency oscillation components, and a correspondingly wide frequency spectrum upon the superimposition thereof stochastically in respect of time, which results in high-energy microwave emission by way of an antenna connected to the common discharge circuit.

The charging currents like thereafter also the short-circuit currents preferably pass by way of an inductor which is common to all charge storage means. That inductor which can simply be in the form of a coaxial cable provides for decoupling of the charge storage means which are connected in mutually parallel relationship, to the effect that, when a discharge spark gap thereof is first switched through, it is not the case that all other discharge circuits are also already triggered but only by virtue of their individual response characteristics, in minimally time-displaced relationship, lead to uncorrelated initiation of the discharge currents which are then superimposed on each other, and thereby supply the very wide-band spectrum of microwave energy, around a key point which is determined by the inductor.

Each of the L-C discharge circuits which are coupled together by way of the common inductor resonates with a common antenna which is connected in unipolar mode to the inductor and which is firstly charged up with the charge storage means and which then with the discharge thereof carries correspondingly oscillating currents, that is to say emits the microwave spectrum. Antenna tuning to the highest possible level of efficiency for the main focus, which is just being emitted, of the microwave spectrum, can be adjusted by way of the length or impedance matching thereof. By way of the magnitude of the inductor in the common discharge circuit, it is possible to displace the main focus of the microwave spectrum, more specifically with increasing inductance to greater wavelengths. The emission becomes wider-band, if instead of a simple conductor the antenna used is a less slender structure, for example a short tube; more desirably by way of a conically enlarging coupling portion for impedance matching from the short-circuit circuitry to the compact antenna geometry.

Because the discharging operations are self-controlling, that is to say the charge storage means are discharged by way of their individual spark gaps in uncorrelated fashion, without any functional coupling, they can be cascaded practically as desired in order to increase the energy density and thus the effective range of the microwave generator. In particular for example the parallel connection of sixteen charge storage means with uncontrolled discharge spark gaps with a switching rate of the order of magnitude of 80 KHz at the common antenna affords a high-energy wide-band noise signal of the order of magnitude of one MHz.

The slight time displacement of the response on the part of the individual discharge spark gaps which switch through in an untriggered high-speed manner and thus the superimposition, which is time-shifted stochastically slightly relative to each other, of the short-circuit currents over the common discharging inductor of the microwave generator according to the invention therefore results in a wide-band noise signal with corresponding wide-band resonance phenomena in input stages of electronic circuits which can thus be overcontrolled and thereby put out of operation or even electrically overloaded and thereby mechanically destroyed.

BRIEF DESCRIPTION OF THE DRAWING

Additional alternative developments and further features and advantages of the invention will be apparent from the further claims and the description hereinafter of a preferred embodiment by way of example of the structure according to the invention which is diagrammatically shown in abstracted form in the drawing in the form of a block circuit diagram, being limited to what is essential. The single FIGURE of the drawing shows in a linear development a group of charge storage means which are provided with individual discharge spark gaps and which are connected in mutually parallel relationship for the charging operation and which are connected in unipolar mode to an antenna for the radiation of microwave energy.

DETAILED DESCRIPTION OF THE INVENTION

Figure 1:
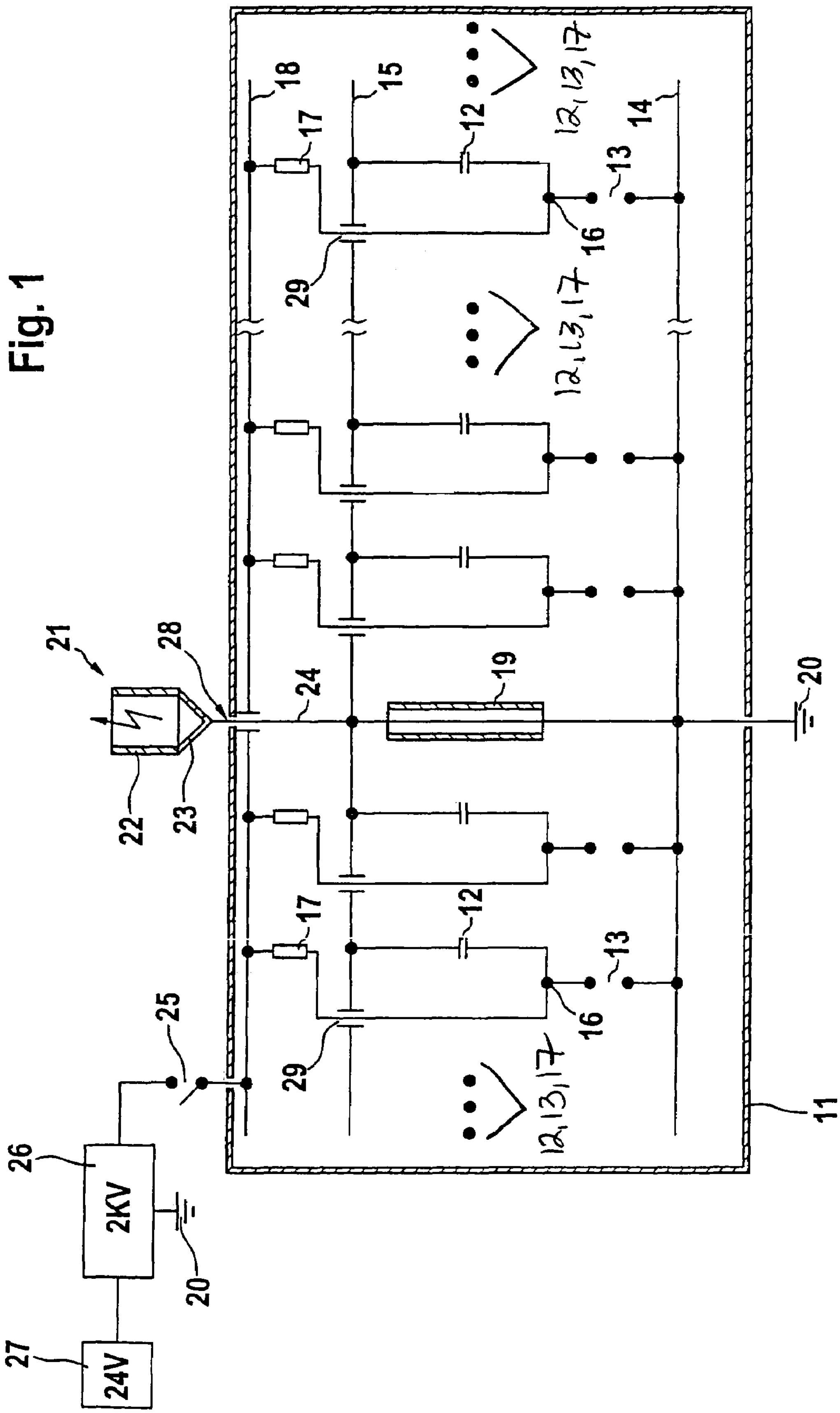

The microwave generator 11 diagrammatically shown in the drawing has a number of charge storage means 12 which are each electrically connected in series with a discharge spark gap 13 between a common ground bus bar 14 and a common pole bus bar 15. Connected to the respective connecting point 16 between a charge storage means 12 and a spark gap 13 is a charging resistor 17 which on the other hand is taken to a common charging bus bar 18. Connected in parallel with all series circuits of charge storage means 12 and spark gap 13, between the ground bus bar 14 and the pole bus bar 15, is an inductor 19 which preferably, as diagrammatically illustrated, is in the form of a short portion of a coaxial line. An antenna 21 for the emission of microwave energy is connected to the pole bus bar 15. It can be in the form of a simple slender conductor portion (in the form of wire or rod). More desirable is an antenna 21 which, as diagrammatically illustrated, is spatially compact, being in the form for example of a short pin or tube portion 22 which is connected to the pole bus bar 15 by way of a matching portion 23 for impedance transformation. The matching portion 23, as diagrammatically illustrated, can then form a conical or frustoconical structure, for example a funnel-shaped hollow truncated cone between the tube portion as the antenna 21 and a connecting cable 24 to the pole bus bar 15.

The ground bus bar 14 is taken to a common apparatus ground 20. The charging bus bar 18 goes by way of an operating switch 25 which is preferably also in the form of a quick-switching spark gap to a high voltage generator 26 for example in the form of a small-scale Marx impulse voltage circuit of the kind described in the opening part of this specification, which in turn is fed from a stationery or transportable energy source 27, for example an assembly of commercially available motor vehicle batteries.

When the operating switch 25 is closed (bridged over), the charging bus bar 18 is connected in single-pole mode to the high voltage potential of the high voltage generator 26 which is connected with its other pole to the apparatus ground 20. As a result, for each charge storage means 12, a charging current flows by way of the series connection of its charging resistor 17 and the inductor 19 which in turn is connected to the apparatus ground 20. When a charge storage means 12 is sufficiently charged up its spark gap 13 which is solely voltage-controlled, that is to say not externally initiated, and which switches through very rapidly, responds, and the charge storage means 12 discharges with a strongly oscillating short-circuit current which correspondingly occurs with a steep edge, between the ground bus bar 14 and the pole bus bar 15, by way of the inductor 19. By virtue of the decoupling by way of the inductor 19 which is common to the charging circuits, the first discharge current which occurs still does not equally lead to triggering also of the further discharge spark gaps 13; but they only respond when the charge storage means 12 associated therewith in series connection are sufficiently charged up. That leads to a randomly governed, minimal mutual displacement of initiation of the individual discharging currents and thus a wide-band current oscillation by way of the common inductor 19 which is now in the discharge circuit. The current correspondingly oscillates in the antenna 21 connected to the pole bus bar 15 and thus to the inductor 19, which results in radiation of that wide-band, high-energy microwave spectrum.

For an equally compact structure and in order to promote a fast uniform charging operation of all charge storage means 12 which are then discharged virtually simultaneously, it is desirable for the storage means 12 together with their discharge spark gaps 13 with a colinear arrangement (as diagrammatically illustrated in the drawing) of the charging resistors 17 associated therewith to be constructed in the form of a circular group (in contrast to the linear development as diagrammatically illustrated) between disc-shaped (approximately ring-shaped) bus bars 14-15-18 with the inductor 19 arranged between the ground and pole bus bars 14-15 in coaxial relationship in the centre of the circular group of the charge storage means 12. The centre of the disc of the charging bus bar 18, which disc serves as a cover plate for the mechanical structure, has a connecting cable 24 passing therethrough at a ducting means 28, between the pole bus bar 15 and the antenna 21. The individual charging resistors are then passed through a ring of holes 29 in the disc of the pole bus bar 15 to the connecting points 16 between the storage means 12 and the spark gap 13.

A microwave generator 11 in accordance with the invention of that kind therefore has a parallel connection of series connections of uncontrolled discharge spark gaps 13 and charge storage means 12 which are charged up by way of charging resistors 17 and an inductor 19 common to all parallel connections, from a high voltage generator 26, until the respective spark gaps 13 extremely quickly short-circuit by way of arcs and the storage means 12 are discharged again by way of the inductor 19. The oscillating short-circuit currents which thus occur in stochastic steep-edged manner and which are superimposed on each other in the inductor 19 are emitted by way of an antenna 21 connected in single-pole manner thereto in the form of a high-energy microwave spectrum which is wide-band in accordance with the arc switching speed, with a spectral key point which is determined by the inductor 19. Such an electrically cascadable operative system which can be used as a non-lethal interference or jamming device in relation to communication connections and in relation to the function of electronic circuits can be embodied in the size of a manually portable case or also in the form of a payload for a submunition projectile, a rocket or a drone and can thus be used over a wide operative range.

The invention claimed is:

1. A microwave generator (11) with a plurality of series circuits of charge storage means (12) and self-triggering discharge spark gap (13) connected in series with each other, said plurality of series circuits being connected in parallel with each other, with a connection of an antenna (21) to a common pole bus bar (15) of the charge storage means (12) and a connection of charging resistors (17) to connecting points (16) between the charge storage means (12) which are respectively associated therewith and the discharge spark gaps (13) thereof, and with a series inductor (19) being connected in the common discharge circuit of all charge storage means (12) between an end of the charge storage means (12) which is remote from the spark gap (13) and an end of the spark gap (13), which is remote from the charge storage means (12), wherein the series inductors (19) is connected between the end of the spark gap (13) which is remote from the charge storage means (12) and the antenna (21), and wherein the series inductor (19) is arranged for decoupling of the charge storage means (12) to the effect that, when one of the discharge spark gaps (13) is switched through first, it is not the case that all other discharge spark gaps (13) are also already triggered but the other discharge spark gaps (13) only by virtue of their individual response characteristic are respectively switched through, leading to uncorrelated initiation of discharge currents.

2. A microwave generator according to claim 1, wherein the charging resistors (17) are jointly connectable in single-pole mode to a high voltage generator (26).

3. A microwave generator according to claim 1, wherein the charge storage means (12) is conducted in single-pole mode to the common pole bus bar (15), the spark gaps (13) being connected in single-pole mode to a common ground bus bar (14) and the charging resistors (17) being connected in single-pole mode to a common charging bus bar (18).

4. A microwave generator according to claim 3, wherein the bus bars (14, 15, 18) are each of a disc-shaped configuration, and wherein, in colinear relationship with the charging resistors (17) thereof, the series connections which are of a colinear configuration consisting of charge storage means (12) and spark gaps (13) are grouped around the series inductor (19).

5. A microwave generator according to claim 4, wherein the antenna (21) is connected to the common pole bus bar (15) by way of a ducting means (28) in the disc-shaped charging bus bar (18) extending therethrough at the inductor (19).

6. A microwave generator according to claim 4 or 5, wherein the charging resistors (17) which are arranged colinearly with the charge storage means (12) and the spark gaps (13) thereof and which are further connected to the disc-shaped charging bus bar (18) are connected through holes (29) in the disc-shaped common pole bus bar (15) to the connecting points (16) of the charge storage means (12) associated therewith to the spark gaps (13).

* * * * *